Jan. 9, 1945.  G. CHRISTENSON  2,366,832
PACKING
Filed Jan. 17, 1942
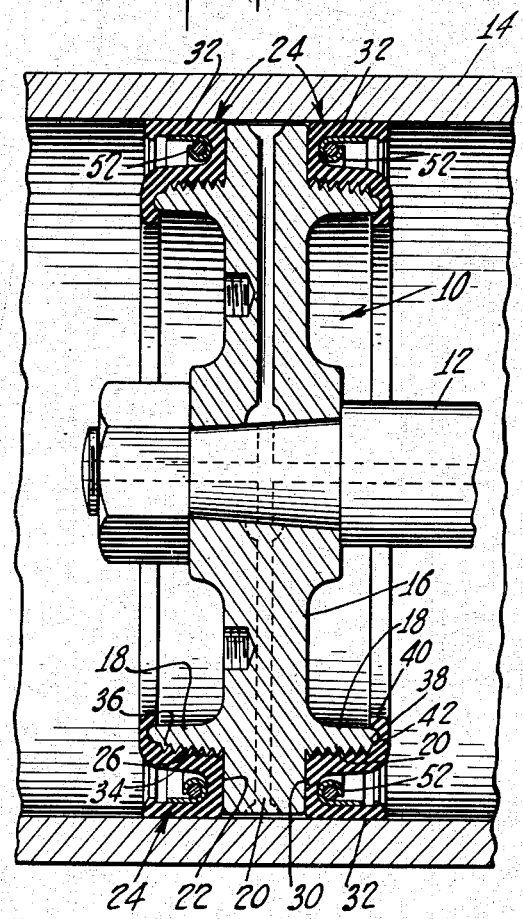
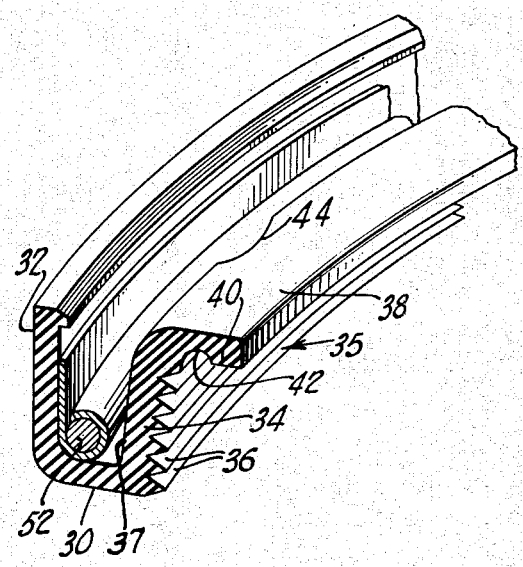
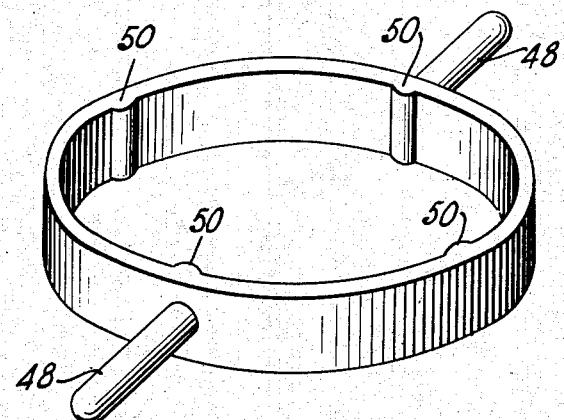
INVENTOR
GEORGE CHRISTENSON
BY
Virgil C. Kline
ATTORNEY Patented Jan. 9, 1945

2,366,832

UNITED STATES PATENT OFFICE 2,366,832

PACKING

George Christenson, Plainfield, N. J., assignor to Johns-Manville Corporation, New York, N. Y., a corporation of New York Application January 17, 1942, Serial No. 427,098

9 Claims. (Cl. 309—34)

The present invention relates to cylinder and piston assemblies, and particularly to such assemblies employed in power reverse mechanisms, air brake systems, and the like. More particularly the invention is concerned with improvements in the piston packings and their means of attachment to pistons of the above-referred-to types of assemblies.

Cylinder and piston assemblies as heretofore provided, for example, in power reverse mechanisms include a piston conventionally of the type illustrated in my Patent No. 2,218,638, issued October 22, 1940, comprising a multiplicity of assembled parts. A packing, often referred to in the art as a cup packing, is carried by the piston, the packing having a base seating upon the piston head and an outer lip or flange for sliding and sealing engagement with the cylinder wall. According to previous practice, the packing has been retained in position on the piston head by means of a keeper ring and a plurality of bolts or studs extending through the keeper ring and the base of the packing and into the piston head. In double-acting pistons a packing is employed adjacent to each face of the piston head.

My present invention is particularly concerned with, and has for its principal object, the provision of an improved piston-packing construction of a simplified type and adapted for ready assembly and disassembly.

A further object of the invention is the provision of an improved cup packing to be employed in assemblies of the type referred to above.

A still further object of the invention is the provision of improved piston-packing assemblies, including screw thread means for engagement of the packing with the piston.

My invention will be more fully understood, and further objects and advantages thereof become apparent, when reference is made to the more detailed description thereof which is to follow and to the accompanying drawing, in which:

Fig. 1 is a sectional view of a piston cylinder assembly incorporating the instant invention;

Fig. 2 is a fragmentary view, partially in perspective and partially in section, illustrating a cup packing embodying the invention; and Fig. 3 is a perspective view illustrating a tool which may be employed in forming the assembly.

Referring now to the drawing, and particularly to Fig. 1, a piston cylinder assembly is illustrated comprising a double-acting piston 10 carried by a piston rod 12 and adapted for reciprocation within a cylinder 14. The piston 10 includes a main body portion 16 having extending from each face an annular projecting portion or flange 18 defining an annular wall 20 spaced from the outer periphery of the piston. Between the walls 20 and the outer periphery of the piston are annular surfaces 22 forming seats for packings 24. Annular walls 20 extend from the surface 22 at an angle somewhat greater than a right angle, as illustrated, and are provided with screw threads 26.

The packings 24 (see particularly Figs. 1 and 2) each comprise a base portion 30 adapted to seat upon an annular surface 22, an upstanding lip or flange 32 for sliding and sealing engagement with the cylinder wall, and an inner upstanding flange 34. The packings are preferably formed of laminated asbestos or other fabric, suitably impregnated with a plastic material such as rubber composition, the impregnated fabric being suitably the same as, or similar to, that heretofore conventionally employed for packings of this general type. However, other suitable materials may be employed; for example, the packings may be composed entirely of plastics, where such is found desirable. The packings are suitably formed to the desired configuration by molding operations.

The face 35 of the flange 34, hereinafter referred to as the "outer face" of said flange, is provided with screw threads 36 adapted to be threaded into the screw threads 26 carried by annular wall 20. Suitable screw threads 36 are at a slightly different pitch, or otherwise not in strict conformity with the threads 26, whereby upon engagement of the threaded surfaces some distortion of threads 36 takes place to enhance the locking of the cooperating threaded portions. Also, the outer face, at least, of flange 34 extends from base 30 at an angle substantially the same as the angle of extension of wall 20 from surface 22.

Where the packing is to be mounted on a piston of the type disclosed in Fig. 1, for example, flange 34 of the packing preferably has inwardly projecting therefrom, at approximately right angles thereto, a flange 38 including a downwardly extending lip 40 defining with flange 34 a recess 42 for receiving the upper edge of the annular projection 18. The inner face 37 of flange 34 is provided with suitable means, such as the recesses illustrated at 44, to receive cooperating members of a packing-installing device. An installing device which may be suitable for this purpose is illustrated in Fig. 3, comprising a ring adapted for insertion between the flanges of the packing, handles 48 for turning the ring, and a plurality of bosses or ridges 50 adapted for engagement in the slots or recesses 44. As will be understood, bosses 50 and recesses 44 are complementary in shape, position, and number.

In assembling the packing on the piston, the threads of the packing are engaged with the cooperating threads on the cylinder and the tool is inserted with the bosses 50 engaged in recesses 44. The tool is then turned in a direction to screw the packing onto the piston until the base 30 of the packing is forced tightly against annular surface 22 of the piston, and flange 38, where such flange is employed, is drawn down until the upper edge of projection 18 is received in annular recess 42. The tool is then removed. When the packing is in its proper position on the piston, an expander ring 52 of any suitable or conventional type is positioned within the packing as illustrated, and the assembly is ready for use. When removal of the packing from the assembly is desired, the order of operations is reversed.

Where, as previously referred to, threads of slightly different character are employed for the packing and the piston, some distortion of the threads on the packing takes place, owing to the plastic character of the material from which the packing is made, and an enhanced binding effect is obtained.

Having thus described my invention in rather full detail, it will be understood that these details need not be strictly adhered to, but that various changes and modifications will suggest themselves to one skilled in the art, all falling within the scope of the invention as defined by the subjoined claims.

What I claim is:

1. A piston packing comprising an annular base, an integral flange extending from the outer periphery of the base and adapted for sliding and sealing engagement with a cylinder wall, and an integral flange extending from the inner periphery of the base, said second-mentioned flange including an outer face carrying screw threads, and means on the other face of said second-mentioned flange for cooperation with a packing-installing tool.

2. A piston packing comprising an annular base, an integral flange extending from the outer periphery of the base and adapted for sliding and sealing engagement with a cylinder wall, and an integral flange extending from the inner periphery of the base, said second-mentioned flange including an outer face carrying screw threads and having a flange extending outwardly from the upper edge thereof, said last-mentioned flange including a recess for the reception of an annular projection of a piston.

3. A piston packing comprising a yieldable, hardened plastic material and having an annular base, an integral flange extending from the outer periphery of the base and adapted for sliding and sealing engagement with a cylinder wall, and an integral flange extending from the inner periphery of the base, said second-mentioned flange including an outer face diverging with respect to said first-mentioned flange and carrying screw threads adapted for engagement with a threaded portion of a piston head, means on the other surface of said second-mentioned flange for cooperation with a packing-installing tool and a flange extending outwardly from said second-mentioned flange at the upper edge thereof and including a recess for the reception of an annular projection of a piston.

4. In combination, a piston including an annular portion and an upstanding annular wall at the inner edge thereof, and a packing carried by said piston, said packing comprising a base seated on the annular portion of said piston, a flange extending from the outer periphery of the base and a flange extending from the inner periphery of the base and lying adjacent to said annular wall, said annular wall and said second-mentioned flange including cooperating screw threads, and means on the inner face of said second-mentioned flange for engagement by a packing-installing tool.

5. In combination, a piston including an annular portion and an upstanding annular projection at the inner edge thereof, and a packing carried by said piston, said packing comprising a base seated on the annular portion of said piston, a flange extending from the outer periphery of the base and a flange extending from the inner periphery of the base and lying adjacent to a face of said annular projection, cooperating screw threads carried by the adjacent faces of said inner flange and annular projection, and a flange extending from said second-mentioned flange and overlying the upper edge of said annular projection.

6. In combination, a piston including an annular portion and an upstanding annular projection at the inner edge thereof, and a packing carried by said piston, said packing comprising a base seated on the annular portion of said piston, a flange extending from the outer periphery of the base and a flange extending from the inner periphery of the base and lying adjacent to a face of said annular projection, cooperating screw threads carried by the adjacent faces of said inner flange and annular projection, and a flange extending from the upper edge of said second-mentioned flange and including a recess receiving therein the upper edge of said annular projection.

7. In combination, a piston including an annular portion and an upstanding annular projection at the inner edge thereof, and a packing carried by said piston, said packing camprising a base seated on the annular portion of said piston, a flange extending from the outer periphery of the base and a flange extending from the inner periphery of the base and lying adjacent to a face of said annular projection, cooperating screw threads carried by the adjacent faces of said inner flange and annular projection, and a flange extending from the upper edge of said second-mentioned flange and including a recess receiving therein the upper edge of said annular projection, the inner surface of said second-mentioned flange including recesses for cooperation with a packing-installing tool.

8. A piston packing for assembly with a piston including an annular portion and an upstanding annular wall at the inner edge thereof, said wall carrying screw threads, said packing comprising a base for seating on said annular portion, a flange extending on the outer periphery of the base and a flange extending from the inner periphery of the base, said second-mentioned flange carrying screw threads for threaded engagement with the threads of said annular wall, the threads of said second-mentioned flange differing from the threads of the annular wall, whereby, upon assembly of said packing and piston, the threads of said second-mentioned flange are distorted to firmly bind said packing and piston together.

9. A piston packing of substantially uniform hardness throughout, comprising a yieldable hardened plastic material having a relatively narrow annular base, an integral flange extending from the outer periphery of the base, an integral flange extending from the inner periphery of the base, and an integral flange extending outwardly at substantially right angles to said second-mentioned flange from the upper edge thereof, said second-mentioned flange including an outer face carrying screw threads.

GEORGE CHRISTENSON.